United States Patent [19]

Matsuda et al.

[11] 4,012,679
[45] Mar. 15, 1977

[54] METHOD AND APPARATUS FOR CONTROLLING THE OPERATION OF SYNCHRONOUS MOTOR

[75] Inventors: Yasuo Matsuda; Takeo Maeda; Kouzou Watanabe; Kazuo Honda; Hironori Okuda; Kunio Miyashita, all of Hitachi; Yasuyuki Sugiura, Takahagi, all of Japan

[73] Assignee: Hitachi, Ltd., Japan

[22] Filed: Jan. 23, 1975

[21] Appl. No.: 543,306

[30] Foreign Application Priority Data

Jan. 6, 1974 Japan .............................. 49-14462
Feb. 8, 1974 Japan .............................. 49-15497

[52] U.S. Cl. .............................. 318/167; 318/171; 318/174; 318/175; 318/178
[51] Int. Cl.² .......................................... H02P 1/46
[58] Field of Search .......... 318/167, 171, 174, 175, 318/178

[56] References Cited

UNITED STATES PATENTS

| 2,852,726 | 9/1958 | Ocnaschek | 318/178 X |
| 3,307,092 | 2/1967 | Trocchio | 318/174 X |
| 3,388,305 | 6/1968 | Smith | 318/175 |
| 3,896,351 | 7/1975 | Blaschke | 318/175 |

Primary Examiner—Gene Z. Rubinson
Attorney, Agent, or Firm—Craig & Antonelli

[57] ABSTRACT

A method and an apparatus for controlling the operation of the synchronous motor are disclosed in which the synchronous motor is started with a starting power supply and operated with a steadying power supply. The starting power supply is adapted to alternately repeat acceleration and deceleration of the synchronous motor in the neighborhood of the frequency thereby to bring the synchronous motor into the point where the synchronous motor is in synchronism with the steadying power supply. The starting power supply comprises a current control circuit and a phase angle control circuit, which circuits control the motor current in such a manner as to prevent the voltage drop due to the synchronous reactance of the motor from exceeding the induced voltage of the motor, while at the same time controlling the power factor angle to be in the range from a lead 90° to the angle corresponding to a maximum output point produced by said motor current.

6 Claims, 15 Drawing Figures

Eo > IX

Eo < IX

METHOD AND APPARATUS FOR CONTROLLING THE OPERATION OF SYNCHRONOUS MOTOR

BACKGROUND OF THE INVENTION

The present invention relates to a method and an apparatus for controlling the operation of a synchronous motor or more in particular to a method and an apparatus for controlling the operation of a synchronous motor in which the synchronous motor is started with a starting power supply and run in steady state with a steadying power supply.

In the case where a multiplicity of synchronous motors in parallel are operated as a group at the same time, a conventional method so far suggested uses a single inverter or cyclo-converter or other current-type static power converter as a driving power supply for the dual purpose of starting and steady operation.

Such a method, in spite of its advantage that the motor can be started substantially from the zero frequency, has the shortcoming of a high impedance as viewed from the synchronous motor side, making it unsuitable for group operation of a multiplicity of motors from the viewpoint of its stability or especially prevention of hunting.

Since the power converter is used for both starting and steady operation, its power capacity depends on the power required for acceleration. When a large number of motors is involved, therefore, there occurs an uneconomically great difference between the total power capacity and the power capacity required for steady operation.

In view of this, an economical motor driving system is desired whereby the synchronous motors can be started from substantially zero frequency, and which enables a multiplicity of synchronous motors in parallel to be operated with high stability and which has a power capacity substantially corresponding to the power required for steady operation.

One method to achieve the above-described system may be to start and accelerate the synchronous motor by the use of a starting power supply such as a static inverter or other power converter and to effect the steady operation thereof by the use of a steadying power supply. This construction, however, poses a problem of how the starting power supply should be switched to the steadying power supply. In one of the suggested methods for the synchronizing transfer, after accelerating the motor temporarily up to a speed higher than the steady frequency by the starting power supply, the starting power supply is cut off, so that the synchronous motor is naturally reduced in speed. During this natural deceleration, the synchronous motor is connected to the steadying power supply by detecting a synchronization between the steadying power supply and the synchronous motor. Even though this synchronizing system has the advantage of simplicity in control operation, the relation between the frequency accuracy for synchronization and the condition for synchronization, that is, the coincidence in voltage, frequency and phase between the two power supplies is determined by the moment of inertia of the mechanical system including the motor and load as well as by the motor revolutions, resulting in a large value of the moment of inertia. In the case where a high accuracy in frequency is required, therefore, the fact that there is only one chance of synchronization during the natural deceleration of the motor makes synchronization very difficult, often causing a synchronization failure. Once synchronization fails, it is necessary to wait until the synchronous motor stops and to repeat the above-mentioned process for synchronization by accelerating the motor with the starting power supply, leading to the disadvantage of a long time required for final successful synchronization.

Further, in the conventional control system using the current-type power converter as a starting power supply, the synchronous motor is controlled by mechanically detecting a rotational position thereof by means of mechanical parts which often fail and are short in life. For this reason, a control system is desired whereby the synchronous motor is capable of being controlled without any mechanical parts in such a manner as to operate both efficiently and stably.

SUMMARY OF THE INVENTION

Accordingly, it is a general object of the present invention to provide an economical method and apparatus for controlling the operation of a synchronous motor whereby the synchronous motor is started from the zero frequency with high stability.

Specifically, an object of the invention is to provide a method and an apparatus for controlling the operation of a synchronous motor whereby the synchronous motor is brought into synchronism within a short time and at high accuracy of frequency upon the transfer from a starting power supply to a steadying power supply.

Another object of the invention is to provide a method and apparatus for controlling the operation of a synchronous motor whereby the synchronous motor is capable of operating always efficiently and stably.

In starting and accelerating the synchronous motor with a starting power supply and effecting steady operation thereof with a steadying power supply according to the invention, the acceleration and deceleration of the synchronous motor is repeated by means of the starting power supply in the vicinity of the frequency of the steadying power supply in order to achieve the transfer of the starting power supply to the steadying power supply under synchronization of the synchronous motor therewith. A current-type power converter is used as the steadying power supply and controlled to limit the motor current in such a manner that the voltage drop due to the synchronous reactance of the synchronous motor is not higher than the induced voltage of the synchronous motor. Further, with this motor current, the power factor angle is regulated between its value where the output of the synchronous motor is maximum and the 90° lead or 90° lag where the motor output is zero.

DESCRIPTION OF THE PREFERRED EMBODIMENTS

Figure 1:
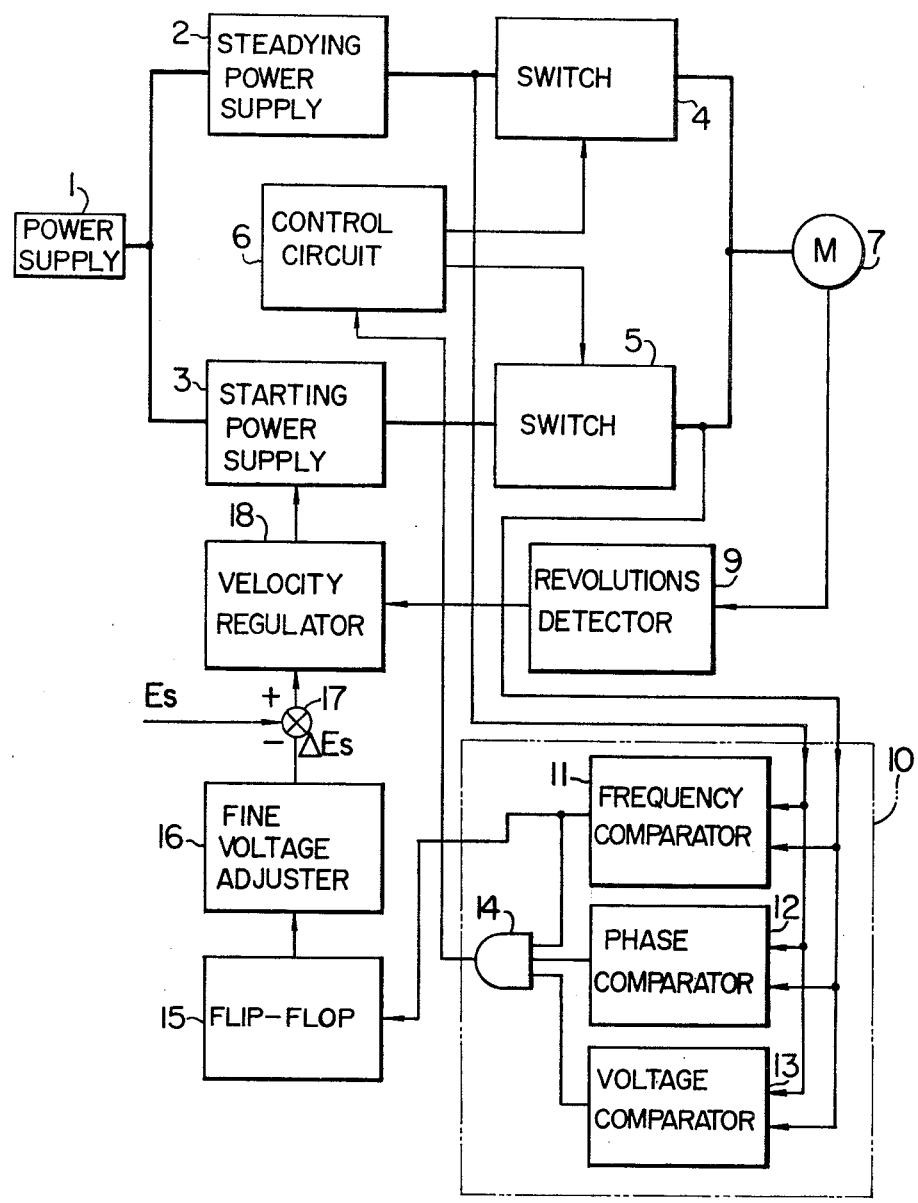
FIG. 1 is a block diagram showing the operation control apparatus for the synchronous motor according to an embodiment of the invention.

An embodiment of the invention is shown in FIG. 1, in which reference numeral 1 shows an input power supply such as a commercial power supply, numeral 2 a steadying power supply, numeral 3 a starting power supply, numerals 4 and 5 switches, numeral 6 a control circuit for operating the switches 4 and 5, numeral 7 a synchronous motor, and numeral 9 a revolution detector circuit for generating a voltage proportional to the number of revolutions of the synchronous motor 7. Reference numeral 10 shows a synchronism detector circuit comprising a frequency comparator circuit 11, a phase comparator circuit 12, a voltage comparator circuit 13 and an AND circuit 14 for generating and applying to the control circuit 6 a synchronism detection signal in the case of coincidence in frequency phase and voltage. The frequency comparator circuit 11 generates an output in a frequency range where the closing of power circuit may be carried out for synchronization. Numeral 15 shows a flip-flop which is set and reset in response to the output from the frequency comparator circuit 11, numeral 16 a fine voltage adjuster for finely adjusting its output voltage ΔEs in response to the output signal from the flip-flop 15, and numeral 17 a differential amplifier for taking a difference or deviation between a predetermined reference voltage Es and the output voltage ΔEs of the fine voltage adjuster 16, the reference voltage Es being a value corresponding to the steady operation frequency of the synchronous motor 7. Reference numeral 18 shows a velocity regulator for controlling the output frequency of the starting power supply 3, namely, the operating frequency of the synchronous motor 7 in response to the output voltage of the differential amplifier 17, that is, the value Es−ΔEs and the output signal from the revolutions detector circuit 9.

The operation of the above-described circuit will be explained below.

Prior to starting the motor, the switch 4 is opened by the control circuit 6 while the switch 5 is closed. At the time of starting the motor, the synchronous motor 7 is thus driven by the starting power supply 3 and subsequently accelerated by the same power supply. When the synchronous motor 7 reaches a steady operation speed, the switch 4 is closed by the control circuit 6 while the switch 5 is opened so that the synchronous motor 7 is thereafter maintained in a steady state by the steadying power supply 2, as will be described more in detail later. By providing the starting power supply 3 and the steadying power supply 2 which are used for starting and steady operation of the synchronous motor, respectively, it is possible to start the motor easily from the zero voltage as well as to achieve a superior stability in steadying operation.

Next, the manner in which the synchronous switching is made from the starting power supply 3 to the steadying power supply 2 will be described with reference to FIG. 2. In the drawing under consideration, symbol (a) shows a variation of the operating frequency of the synchronous motor. The dotted line positioned higher than the steady operation frequency is a set frequency corresponding to the reference voltage Es, whereas the lowest dotted line represents an another set frequency corresponding to the difference Es−ΔEs produced by the differential amplifier 17 in response to the fine output voltage ΔEs from the fine voltage adjuster 16. The upper and lower solid lines show maximum tolerable limits Δf of the synchronous switching frequency deviation. In the event that the difference between the output frequencies of the starting power supply 3 and the steadying power supply 2 is included in this range of tolerable frequency deviation, the frequency comparator circuit 11 produces an output. By the way, the output voltage ΔEs of the fine voltage adjuster 16 is produced for the purpose of effecting speed regulation at a frequency level slightly higher than $f_M + \Delta f$ in the case of the set frequency associated with the reference voltage Es, and at a frequency level slightly lower than $f_M − \Delta f$ when the set frequency is concerned with the reference voltage Es − Es. The value $\Delta f/f_M$ represents the frequency accuracy for synchronous switching. Symbol (b) of FIG. 2 shows the output of the frequency comparator circuit 11, (c) thereof the output of the flip-flop 15, symbol (d) the output of the fine voltage adjuster 16, the graph (e) the opening and closing operation of the switch 5, and symbol (f) the opening and closing operation of the switch 4.

The coincidence of voltage and phase which is required for synchronous switching is easily achieved by the conventional method of synchronous switching. Therefore, the explanation here will be limited to the frequency coincidence.

Figure 2:
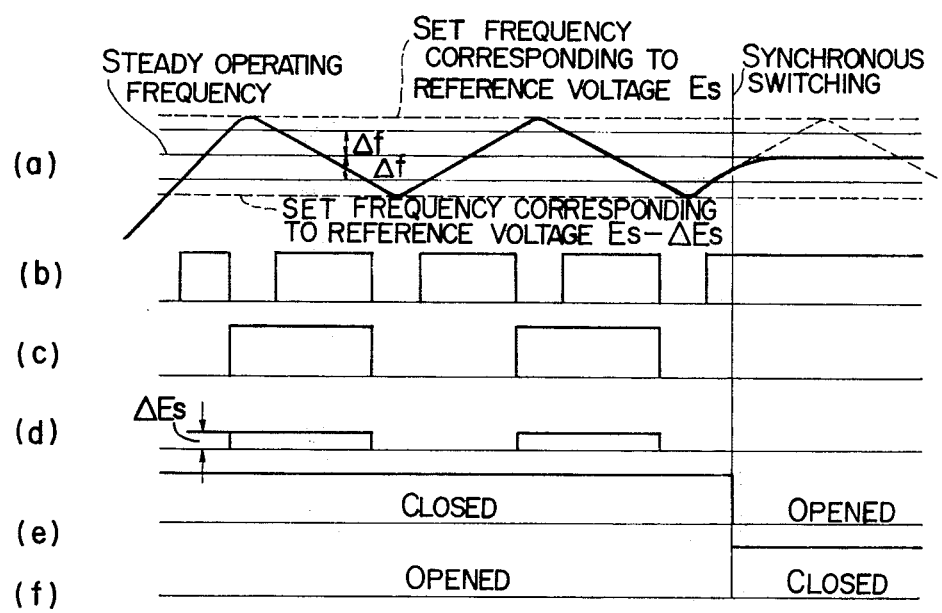
FIG. 2 is a diagram for explaining the operation of the circuit of FIG. 1.

When the synchronous motor 7 is accelerated by the starting power supply 3 and the frequency thereof enters the switching tolerable frequency range, the frequency comparator circuit 11 produces an output signal as shown in (b) of FIG. 2. Under this condition, the reference voltage of the speed regulator 18 is only Es and therefore the set frequency is higher than $f_M + \Delta f$, so that the synchronous motor 7 continues to be accelerated. At the time point when the motor frequency exceeds the value $f_M + \Delta f$, the output of the frequency comparator circuit 11 becomes zero, whereupon the flip-flop 15 is triggered, with the result that the reference voltage of the speed regulator 18 changes to Es − ΔEs. When the reference voltage is Es − ΔEs, the speed regulator 18 is set at a frequency level lower than the level $f_M − \Delta f$ and therefore the synchronous motor 7 enters a deceleration phase. The frequency of the synchronous motor 7 re-enters the synchronous switching tolerable frequency range, thereby causing the frequency comparator circuit 11 to produce an output signal. At the time point where the synchronous motor 7 is decelerated below the level $f_M − \Delta f$, the output of the frequency comparator circuit 11 becomes zero again, so that the flip-flop 15 is triggered and the reference voltage of the speed regulator 18 changes to Es. As a result, the motor 7 is accelerated again. In this way, the motor 7 repeats its acceleration and deceleration until it successfully reaches the point of synchronous operation of the switches. When the point of synchronous switching arrives, the switch 5 opens and the switch 4 closes, thereby subjecting the synchronous motor 7 to a steady operation by means of the steadying power supply 2.

In decelerating the synchronous motor 7 with the power supplied from the starting power supply 3, the rate of frequency variation is considerably reduced as compared with the rate of frequency variation in natural deceleration which will occur when the synchronous motor is cut off from electric power supply, resulting in an increased number of chances of synchronous switching. For this reason, reaching the point of synchronization is easily obtained even when a high frequency accuracy is required. For example, the frequency accuracy of 0.2 to 0.4% which is common in the conventional method may be increased by one order. Also, even in the case where such a high frequency accuracy is required as not necessarily to be able to reach the point of synchronization in one acceleration and deceleration, the transfer to a synchronized state can be achieved without fail within a short period of time by repeating the processes of acceleration and deceleration several times.

Figure 3:
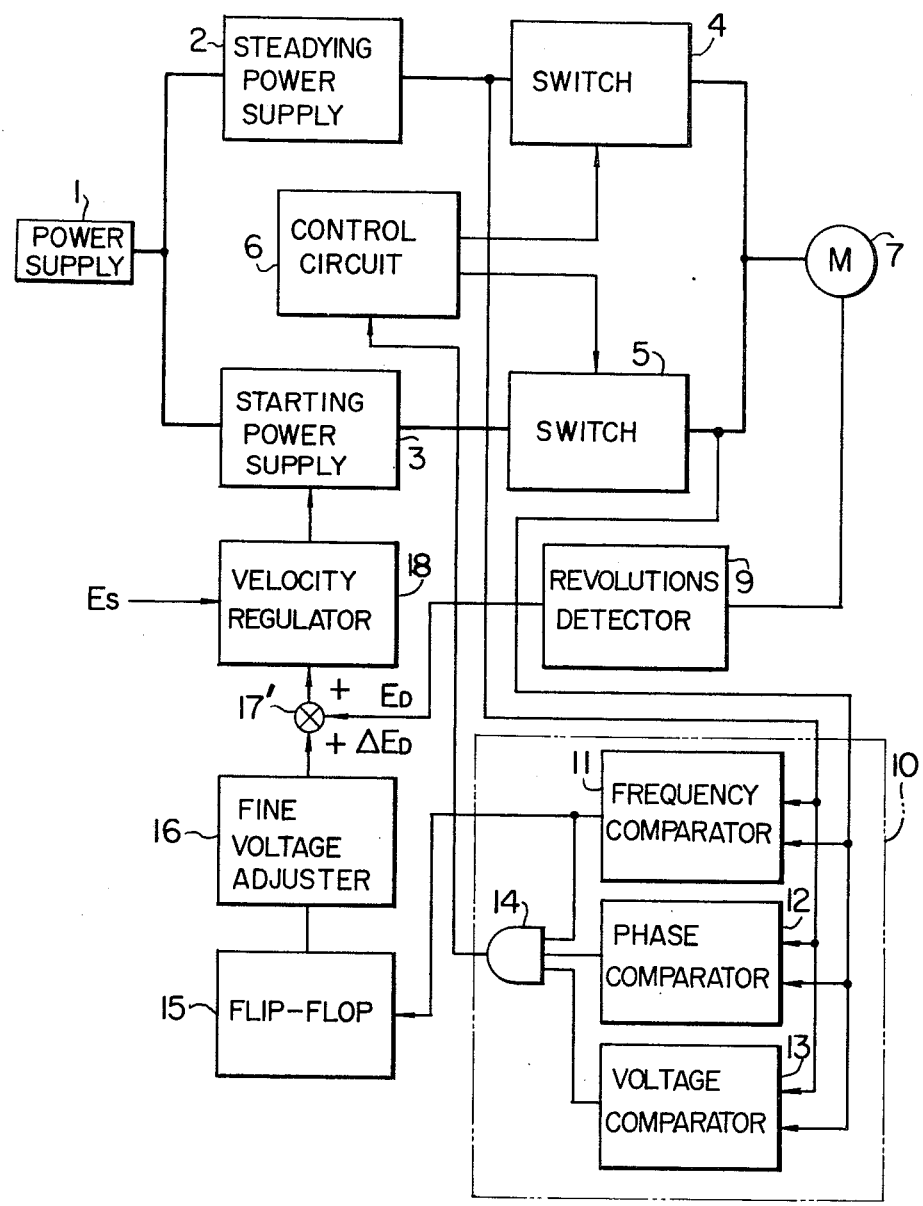
FIG. 3 is a block diagram showing the operation control apparatus for the synchronous motor according to another embodiment of the invention.

Another embodiment of the invention is shown in FIG. 3 and is different from the circuit of FIG. 1 in that both the output of the fine voltage regulator 16 and the output of the revolutions detector circuit 9 are applied to the input of the velocity adjuster 18 through the differential amplifier 17', even though the operation of the embodiment of FIG. 3 is completely the same as that of the circuit of FIG. 1.

It will be understood from the foregoing description that according to the present invention the operating frequency of the synchronous motor is increased and decreased positively in the neighbourhood of the steady operating frequency by the starting power supply for the purpose of achieving a synchronized state, and therefore the synchronizing operation can be performed without fail within a short time at a high accuracy of frequency.

Unlike the preceding case in which the synchronous operation of the switches is performed at the steady operating frequency of the synchronous motor, the synchronous switching operation may alternatively be effected at a frequency considerably below the steady operating frequency. This method, in spite of the need to accelerate the motor up to the steady operating frequency by the steadying power supply, is very effective in the case of the synchronous motor operating at high speed.

Reference is made to the starting power supply 3 and the steadying power supply 2. Preferably, the adjustable-voltage adjustable-frequency power supply including the current-type power converter, which always provides a constant current and is able to start the motor from the zero frequency, is used as the starting power supply 3. For the steadying power supply, on the other hand, the voltage-type power converter including the constant-voltage constant-frequency power supply, which always provides a constant voltage and is stable during steady operation of the motor, should preferably be used. The commercial supply also suffices as the steadying power supply.

Next, explanation will be made below of the manner in which the current-type power converter suitable for the starting power supply is efficiently operated.

Figure 4A:
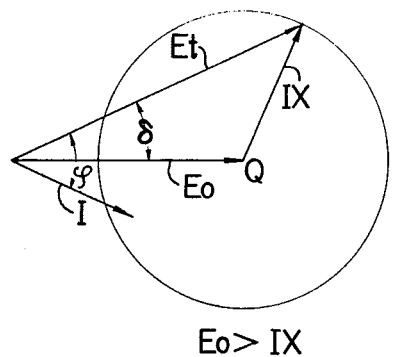
FIGS. 4a and FIG. 4b are vector diagrams for the synchronous motor.
Figure 4B:
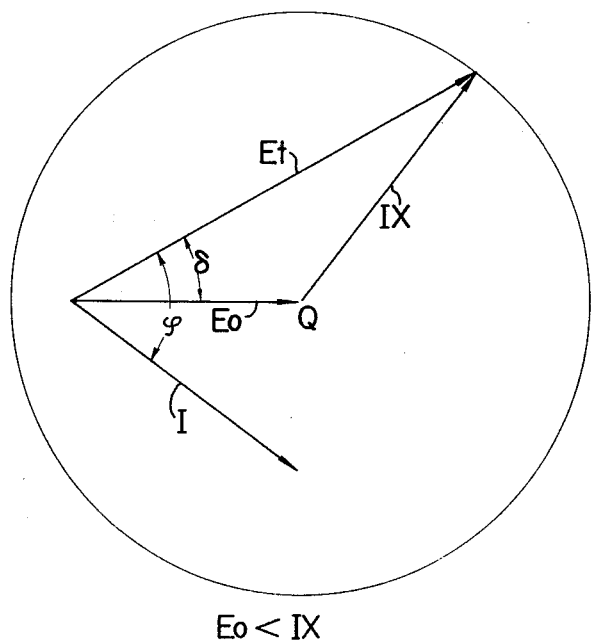

The explanation will be begun with the control characteristics of the synchronous motor as controlled by the current-type inverter. Referring to FIGS. 4a and 4b showing vector diagrams of the synchronous motor driven by the inverter, the terminal voltage Et of the motor is a vectorial sum of the induced voltage Eo in the motor and the voltage drop I.X due to the synchronous reactance, where I is the motor current and X the synchronous reactance. By the way, the phase angle $\delta$ between the terminal voltage Et and the induced voltage Eo is generally referred to as the load angle and the phase angle $\phi$ between the terminal voltage Et and the motor current I as the power factor angle. From the vector diagrams under consideration, the output P of the synchronous motor is expressed as $$P = 3 \frac{E_t \cdot E_o}{X} \sin\delta \quad (1)$$

or as $$P = 3E_t \cdot I\cos\phi \quad (2)$$

or as $$P = 3E_t . I\cos\phi . \ldots \quad (2)$$

Figure 5:
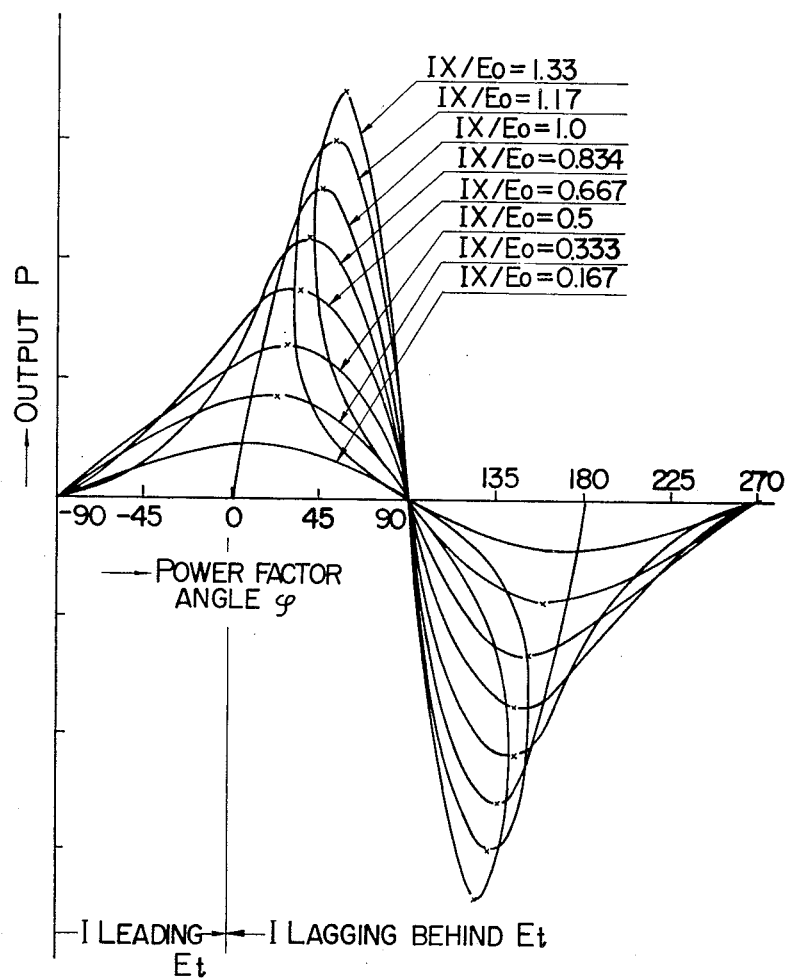
FIG. 5 and FIG. 6 show the operating characteristics of the synchronous motor.
Figure 6:
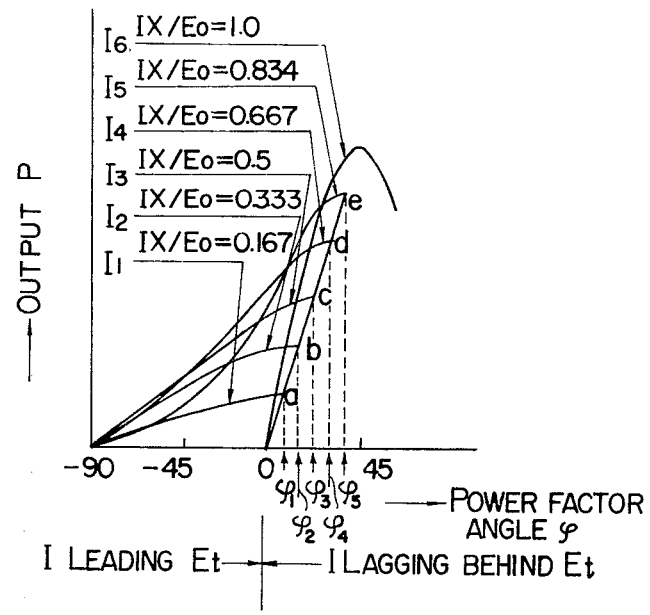

In the current-type inverter, the motor output P is regulated by controlling the power factor angle $\phi$ with the motor current I maintained fixed, and therefore the terminal voltage Et varies with the power factor angle $\phi$ along a circular locus having a center at the tip Q of the vector of induced voltage Eo and the radius of I.X. The vector diagrams of FIG. 4a and FIG. 4b respectively represent the cases in which Eo>I.X and Eo<I.X. The diagram of FIG. 5 showing various motor output P is obtained from the above-mentioned relation between the power factor angle $\phi$ and the terminal voltage Et and from the equation (2). As will be obvious from the diagram under consideration, the motor output P takes one value against a corresponding power factor angle $\phi$ when I.X/Eo<1, while there are a couple of values of motor output P against one power factor angle when I.X/Eo>1. Further, in the region where I.X/Eo 1, the value of the motor output P is determined only in a limited range of the power factor angle $\phi$, so that the motor operation is impossible outside of such a range of power factor angle. It will be noted therefore that it is difficult to control the synchronous motor when I.X/Eo 1. It will also be seen that the power factor angle $\phi$ at which the motor output P is maximum arrives later with the increase in the value of I.X/Eo. Such variations in the maximum output points are approximately traced by a straight line o-e in FIG. 6.

As will be seen from the above description, if the frequency control of the synchronous motor is to be effected both stably and efficiently, the motor current I and the power factor angle $\phi$ should be regulated in such a manner that I.X<Eo at a given induced voltage Eo and also in such a manner that at a given motor current I, the power factor angle $\phi$ is varied in the range from a lead 90° where motor output is zero to a point of maximum output or in the range from a lag 90° where motor output is zero to a point of maximum output.

A current-type inverter for performing the above-described operation will be explained below with reference to an actual example thereof.

Figure 7:
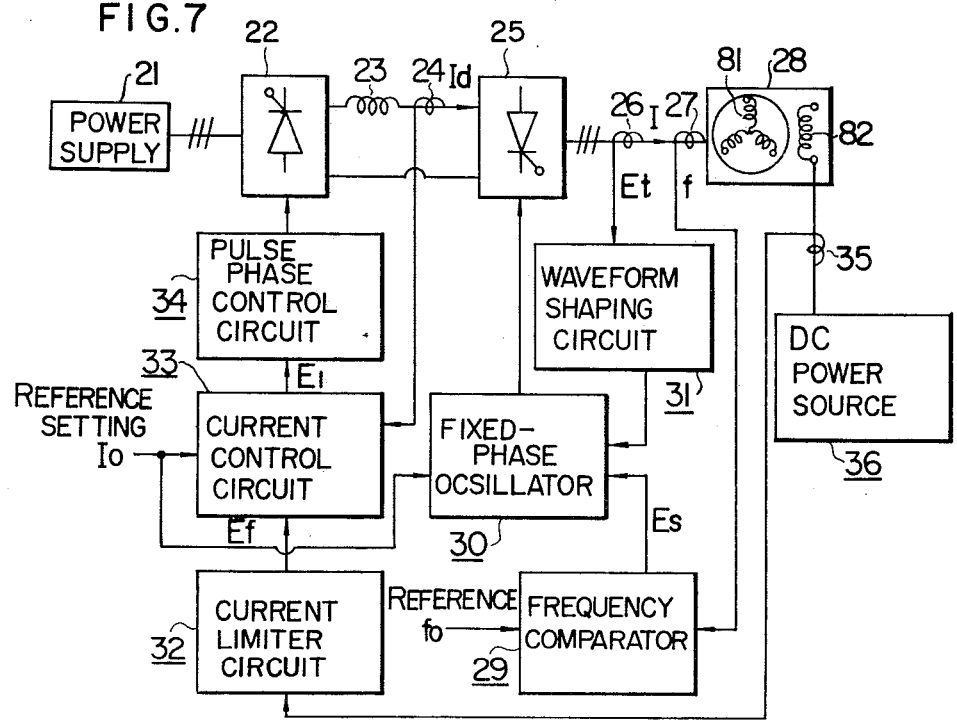
FIG. 7 is a block diagram showing a current-type inverter embodying the present invention.

Referring to FIG. 7 showing a block diagram of the current-type inverter according to an embodiment of the invention, the AC power from the AC power supply 21 is converted into a DC current Id by the rectifier 22 and, through the series reactor 23, applied to the inverter 25. The DC current Id is inverted by the inverter 25 into an AC current in synchronism with the speed of the rotor of the synchronous motor 28, and the resultant AC current is applied to the armature winding 81 of the synchronous motor 28. In the process, the magnitude of the DC current Id produced by the rectifier 22 and the phase of the AC current produced from the inverter 25 are controlled as mentioned below.

Figure 8A:
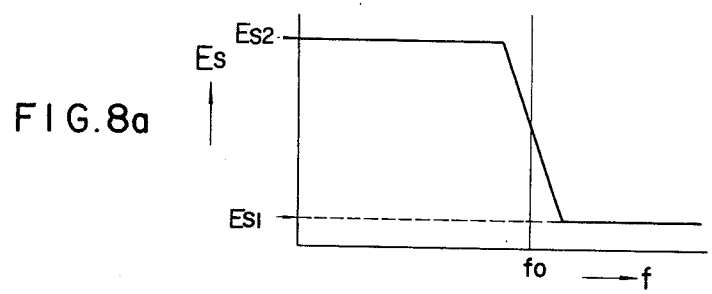
FIGS. 8a to 8c show characteristics of the device shown in FIG. 7.
Figure 8B:
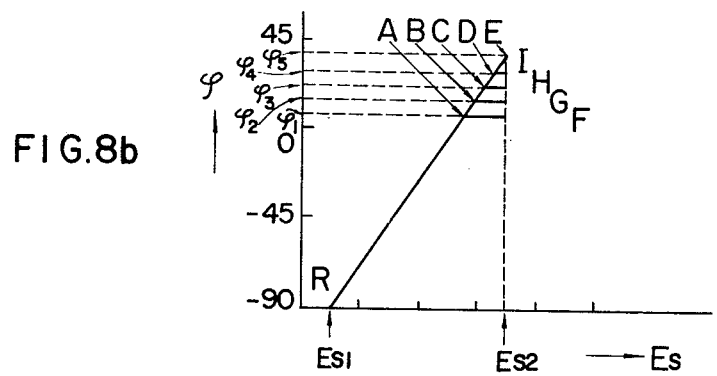
Figure 8C:
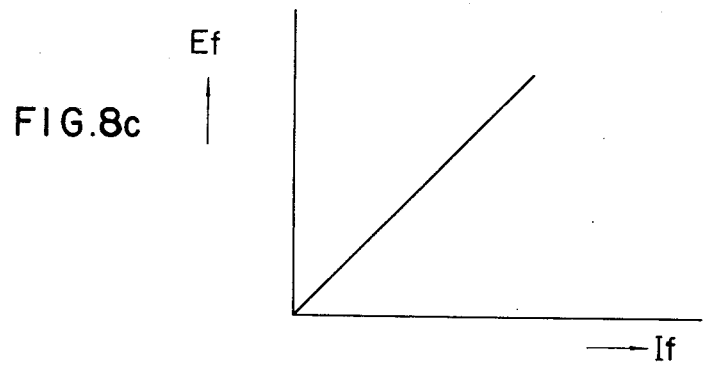

The characteristics diagrams of the frequency comparator 29, the fixed phase oscillator 30 and the current limiter circuit 32 are shown in FIGS. 8a, 8b and 8c respectively. First, the operating frequency $f$ detected from the terminal voltage Et of the synchronous motor 28 by the frequency detector 27 is compared with the reference frequency $f_0$ by the frequency comparator 29, which in turn produces a detection signal Es as shown in FIG. 8a. In response to this detection signal Es, the fixed-phase oscillator 30 controls the power factor angle $\phi$, that is, the phase difference between the terminal voltage Et and the motor current I as shown by the straight line RE of FIG. 8b. In other words, after detecting the terminal voltage Et from the voltage detector 26, an AC voltage without any distortion is picked up from the waveform shaping circuit 31, so that the phase of the motor current I corresponding to the zero intersection or other reference point of the above-described AC voltage is controlled by controlling the output gate pulse phase of the fixed-phase oscillator 30 in such a manner as to achieve the power factor angle $\phi$ as shown in FIG. 8b, thus regulating the phase of the output AC current of the inverter 25. In this case, in view of the fact that the power factor angle $\phi$ may only be changed from $-90°$ to $\phi_1$ for a given set value of, say $I_1$ of the motor current I as obvious from FIG. 6, the reference current $I_0$ for setting the motor current I is applied to the fixed-phase oscillator 30 thereby to limit the variation of power factor angle within the range from $-90°$ to $\phi_1$. For this reason, the characteristics of the fixed-phase oscillator 30 are as represented by the bent curve RAF in FIG. 8b, so that the power factor angle $\phi$ for the motor current $I_1$ is regulated in such a manner that the motor output P ranges only from zero to the maximum output for the motor current $I_1$. In the event that this maximum output is unsatisfactory because of an increased load torque, the setting of the motor current I may be increased accordingly as shown by $I_2$, $I_3$ and so on, in which case the characteristics of the fixed-phase oscillator 30 are as shown by bent curves RBG, RCH and so on of FIG. 8b. Thus it is possible to regulate the power factor angle $\phi$ from the lead 90° to a point corresponding to the maximum value of any current setting.

It was already mentioned with reference to FIG. 5 that the motor output P takes two values for a given power factor angle in the case where $I.X/E_0>1$, that there is no range for lead operation in the case where $I.X/Eo$ is equal to unity, and that the motor output P is decreased with the increase in the setting of the current of the synchronous motor for a leading power factor angle $\phi$ in the case where $I.X/Eo$ is smaller than and approximately unity. In order to operate the motor stably and efficiently, therefore, the value of $I.X/E$ should preferably be lower than, say, 0.8. For this purpose, the magnitude of the motor current I is limited as mentioned below by detecting the induced voltage Eo of the synchronous motor. Referring to FIG. 5, a field current If proportional to the induced voltage E is first detected by a field current detector 35 and applied to the current limiter circuit 32. The field current If is converted by the current limiter circuit 32 into a current limiter signal $E^f$ having the characteristic as shown in FIG. 8c. The current control circuit 33 thus limits the motor current I by fixing the firing angle of the thyristor of the rectifier 2 even if the reference current $I_0$ is set large against the current limiter signal Ef. As a result, in the case where the reference current $I_0$ is set at or below the value $I_{OM}$ determined by the current limiter signal Ef, the current detector 24 detects the DC current Id so that the current control circuit 33 compares the DC current Id with the reference current $I_0$ thereby to control the output pulse phase of the pulse phase control circuit 34 in such a manner that the DC current Id coincides with the reference current $I_0$. When the reference current $I_0$ exceeds the level $I_{OM}$, on the other hand, the DC current is controlled with $I_{OM}$ as a reference. In this way, the value of $I.X/E_0$ is maintained always below a predetermined level depending on the gradient of the straight line of FIG. 8c.

The inverter having the above-described functions effects the frequency control of the synchronous motor as mentioned below.

Assume that the synchronous motor is operating at a field current If due to the induced voltage $E_{01}$ while the current setting is $I_1$. If the load of the motor is increased and the operating frequency is reduced below the reference frequency $f_0$, the output signal Es of the frequency comparator 29 changes toward a higher level as shown in FIG. 8a. With the change in the detection signal Es, the output of the fixed-phase oscillator 30 causes the power factor angle $\phi$ in a lagging manner, thereby raising the motor output P, so that the motor continues to operate at a predetermined frequency $f_0$ at a power factor angle in balance with the load torque. Similarly, in the case of reduction in load torque, the reference current $I_0$ should be increased if the motor current $I_1$ is small as compared with the motor output P required for motor operation. Thus stable operation of the motor is assured since the set current value I is automatically limited in the range shown from the inequality I.Xo<1.

This current-type inverter is used to achieve synchronization with the steadying power supply by repeatedly correcting by Es the detection signal Es produced from the frequency comparator 29, as already described in detail with reference to FIG. 1.

Figure 9:
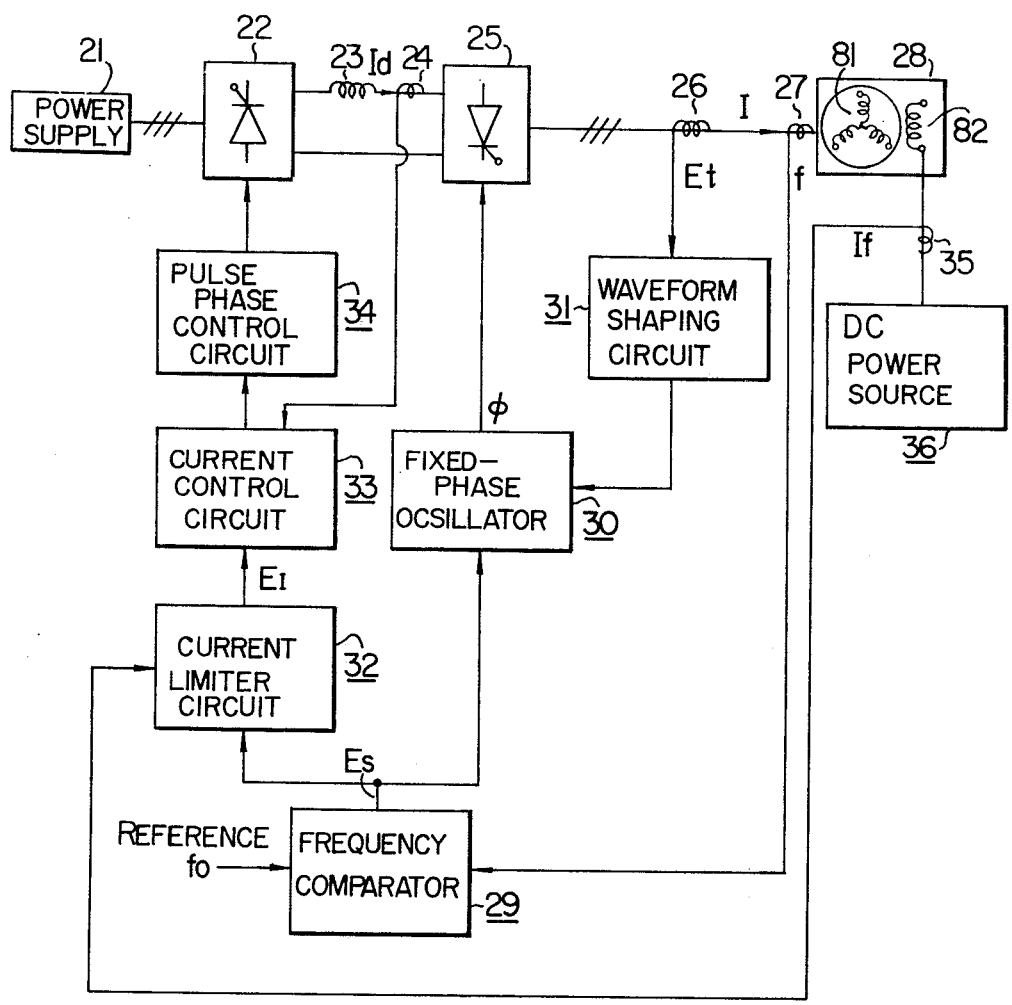
FIG. 9 is a block diagram showing another embodiment of the current-type inverter according to the invention.

Another embodiment of the invention is shown in FIG. 9. An AC voltage produced by the AC power supply 21 is converted into the DC current Id by the rectifier 22. This DC current Id is controlled by the current detector 24, the current control circuit 33 and the pulse phase control circuit 34. Further, the DC current Id is converted into an AC current in synchronism with the rotor speed of the synchronous motor 28 by the inverter 25 through the voltage detector 26 for detecting the terminal voltage Et of the synchronous motor 28, through the waveform shaping circuit 31 and through the fixed-phase oscillator 30. The resulting AC current is applied to the armature winding 81. The above-described operation of the circuit of FIG. 9 is the same as that of FIG. 7, except that the power factor angle $\phi$ and the motor current I are controlled simultaneously as mentioned below.

In FIG. 9, the frequency detector 27 detects the operating frequency $f$ of the synchronous motor 28, which operating frequency $f$ is compared with the reference $f_0$ by the frequency comparator 29. The detection signal Es as shown in FIG. 8a is produced from the frequency comparator 29 and applied to the fixed-phase oscillator 30 and the current limiter circuit 32.

Figure 10:
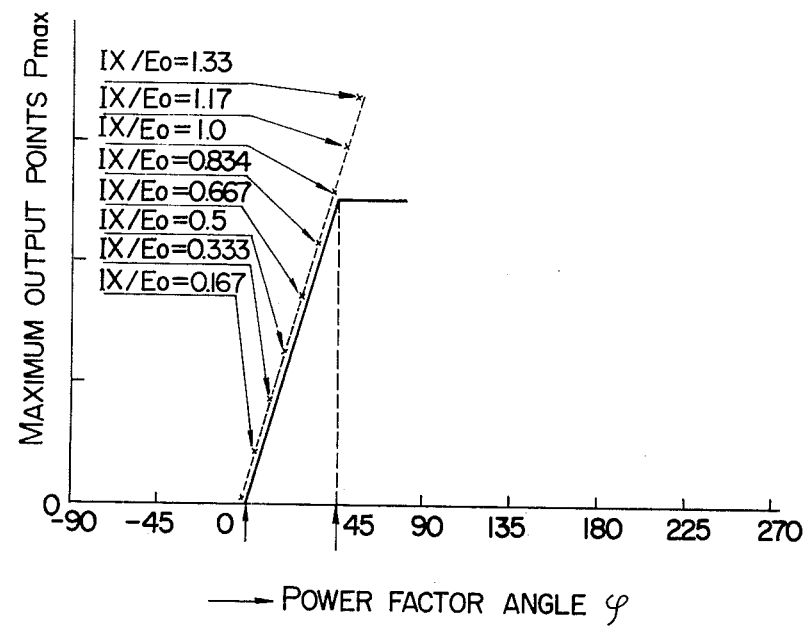
FIG. 10 is a diagram showing the operating characteristics of the synchronous motor.
Figure 11A:
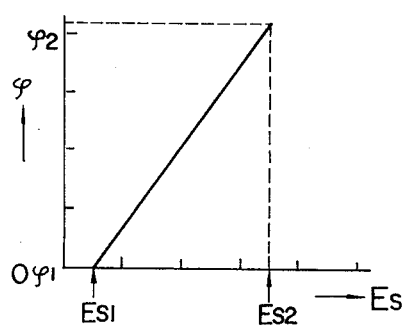
FIGS. 11a and 11b show characteristics of the device shown in FIG. 9.
Figure 11B:
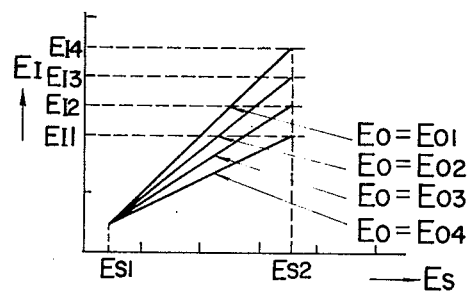

It is assumed here that the fixed-phase oscillator 30 has such characteristics that as shown in FIG. 11a the power factor angle $\phi$ is determined linearly from $\phi_1$ to $\phi_2$ along a straight line against the range of variation $Es_1$ to $Es_2$ of the detection signal Es of the frequency comparator 29, where $\phi_1$ to $\phi_2$ shows the range of the power factor angle corresponding to maximum motor output P, the maximum output points being shown in approximation by the straight line in FIG. 10. Also, the current limiter circuit 32 has such input and output characteristics as shown in FIG. 11b against the output of the field current detector 35 for detecting the induced voltage $E_0$ by detecting the field current If proportional to the induced voltage $E_0$. In the event that the detection signal changes from $Es_1$ to $Es_2$ against the induced voltages $E_{01}, \ldots, E_{04}$, for example, the output signal $E_I$ is represented by a straight line with the gradient depending on the value of the induced voltages $E_0$. The gradient determined by the induced voltage $E_{01}$, for instance, is so controlled that when the output $E_{I1}$ of the current limiter circuit 32 corresponding to the maximum value $Es_2$ of the detection signal Es as shown in FIG. 11b is applied as a reference signal to the current control circuit 33, the DC output current of the rectifier 2 is regulated at the value equal to I in the equation $I.X/E_{01} = 1$ through the circuit comprising the current detector 24, the current control circuit 33 and the pulse phase control circuit 34.

Assume that when the synchronous motor is operated by the field current If at the induced voltage $E_{01}$, the operating frequency is reduced below the reference value $f_0$ due to a change in motor load. The detection signal Es of the frequency comparator 29 increases as seen from FIG. 8a; Due to the change in detection signal Es, the operation of the fixed-phase oscillator 30 causes the power factor angle $\phi$ to change in a leading manner; the output signal $E_I$ of the current limiter circuit 32 increases along the straight line for $E_{01}$ in FIG. 11b thereby to increase the set current applied to the current control circuit 33; the DC current Id is increased and thus the motor current I is increased: and vice versa. As will be obvious from FIG. 10, the power factor angle $\phi$ corresponding to a certain maximum value $P_M$ of the motor output is substantially proportional to the motor current I corresponding to that particular maximum value $P_M$ if the induced voltage $E_0$ is constant. In other words, if the variations of $I.X/E_0$ are equal, the length of a corresponding portion of the straight line in FIG. 10 is substantially fixed. As a result, with the above-mentioned characteristics of the fixed phase oscillator 30 and the current limiter circuit 32 as shown in FIGS. 11a and 11b against the detection signal Es, it is possible to control the power factor angle $\phi$ and the motor current I against the variation in detection signal Es always along the straight line in FIG. 10. In other words, the motor current I and the power factor angle $\phi$ are controlled by controlling the motor current I with the current limiter circuit 32 in such a manner that the power factor angle $\phi$ corresponding to the maximum output against the prevailing value of $I.X/E_0$ is determined by the fixed-phase oscillator, while at the same time always satisfying the condition $I.X/E_0 < 1$. In this way, in the event that the operating frequency of the synchronous motor changes due to a change in load, the motor output is appropriately regulated as mentioned above thereby to enable the revolutions of the synchronous motor to coincide with the reference frequency $f_0$.

We claim:

1. In an apparatus for controlling the operation of a synchronous motor comprising a synchronous motor, a starting power supply connected to said synchronous motor through a first switching means, a steadying power supply connected to said synchronous motor through a second switching means, and a control device for controlling the opening and closing of said first and second switching means; the improvement further comprising a frequency comparator circuit for comparing the frequency of said starting power supply with the frequency of said steadying power supply and producing an output when the difference between said frequencies is not greater than a predetermined value, frequency changer means for reducing the frequency of said starting power supply when the frequency of said starting power supply exceeds a frequency level set higher than the frequency of said steadying power supply and for increasing the frequency of said starting power supply when the frequency of said starting power supply is reduced below said frequency level set higher than the frequency of said steadying power supply, a phase comparator circuit for comparing the phase of said steadying power supply with that of said starting power supply and producing an output when the difference between said phases is smaller than a predetermined value, a voltage comparator circuit for comparing the voltage of said steadying power supply with that of said starting power supply and producing an output when the difference between said voltage is smaller than a predetermined value, and an AND circuit for producing an output and applying said output to a control device when all of said frequency comparator circuit, said phase comparator circuit and said voltage comparator circuit produce outputs.

2. An apparatus for controlling the operation of a synchronous motor according to claim 1, in which said frequency changer means comprise means for increasing the frequency of said starting power supply to a frequency level set higher than the frequency of said steadying power supply, a flip-flop set and reset in response to outputs of said frequency comparator circuit, and means for reducing the frequency of said starting power supply to a frequency level set lower than the frequency of said steadying power supply in response to the output from said flip-flop.

3. An apparatus for controlling the operation of a synchronous motor according to claim 1, in which said starting power supply is a current-type power converter.

4. An apparatus for controlling the operation of a synchronous motor according to claim 3, in which said current-type power converter comprises a current control circuit for controlling the motor current in such a manner that the voltage drop due to the synchronous reactance in said synchronous motor does not exceed the induced voltage of said synchronous motor, and a phase control circuit for controlling the power factor angle of said motor in a range from a point at which the output of said synchronous motor is maximum to a lead 90° or a lag 90° at which the motor output is zero.

5. An apparatus for controlling the operation of a synchronous motor according to claim 4, further comprising means for setting a reference current applied to said current control circuit and said phase control circuit, a frequency detector and an induced voltage detector for detecting the operating frequency and the induced voltage or said synchronous motor respectively, a phase comparator for detecting the difference between said operating frequency detected by said frequency detector and a predetermined reference frequency and for applying a signal representing said difference to a phase angle control circuit, and a waveform shaping circuit for shaping the waveform of the output voltage from said induced voltage detector and applying the resulting output to said phase angle control circuit.

6. An apparatus for controlling the operation of a synchronous motor according to claim 4, further comprising a frequency detector and an induced voltage detector for detecting the operating frequency and the induced voltage of said synchronous motor, a phase comparator for detecting the difference between the operating frequency detected by said frequency detector and a predetermined reference frequency and applying an output to said phase angle control circuit and said current control circuit, and a waveform shaping circuit for shaping the waveform of the output voltage of said induced voltage detector and applying an output to said phase angle control circuit.

* * * * *

UNITED STATES PATENT OFFICE
CERTIFICATE OF CORRECTION

Patent No. 4,012,679      Dated March 15, 1977

Inventor(s) Yasuo MATSUDA et al.

It is certified that error appears in the above-identified patent and that said Letters Patent are hereby corrected as shown below:

[30]      FOREIGN APPLICATION PRIORITY DATA

--- Feb. 6, 1974    Japan .................. 49-14462 ---

Feb. 8, 1974    Japan .................. 49-15497

Signed and Sealed this

First Day of November 1977

[SEAL]

Attest:

RUTH C. MASON      LUTRELLE F. PARKER
*Attesting Officer*      *Acting Commissioner of Patents and Trademarks*